J. E. ARMSTRONG.
WHEELBARROW.
APPLICATION FILED AUG. 24, 1908.
915,533.
Patented Mar. 16, 1909.
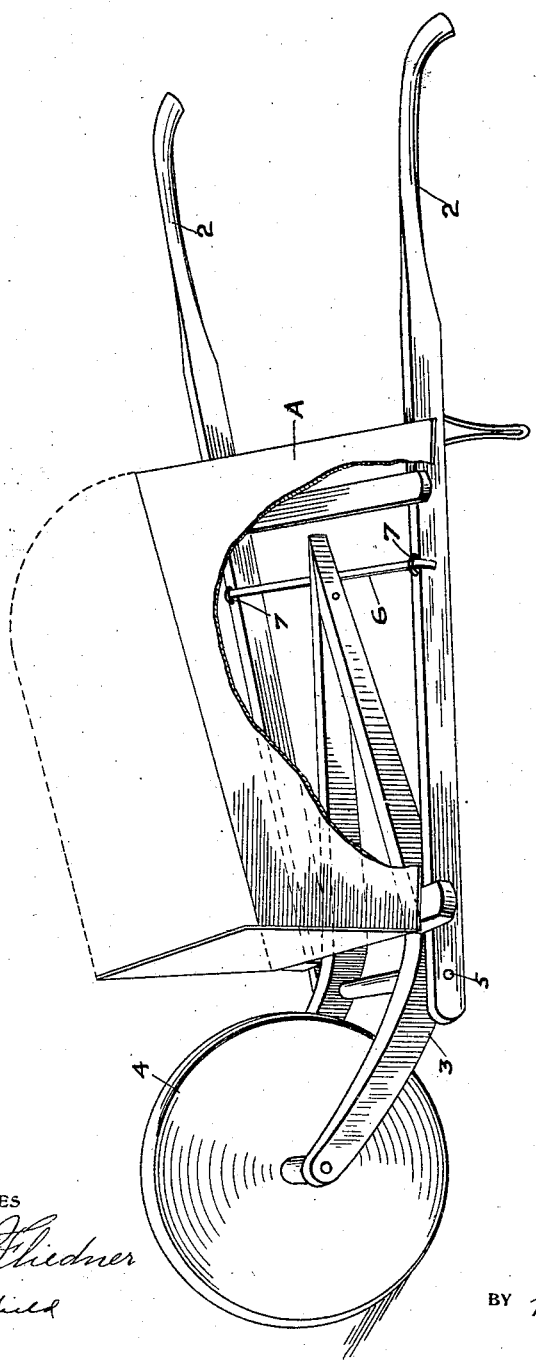
WITNESSES
INVENTOR
BY John E Armstrong
Geo. H. Strong.
ATTORNEY

UNITED STATES PATENT OFFICE.

JOHN EDWARD ARMSTRONG, OF SANTA CRUZ, CALIFORNIA.

WHEELBARROW.

No. 915,533.　　　　Specification of Letters Patent.　　Patented March 16, 1909.

Application filed August 24, 1908. Serial No. 449,939.

*To all whom it may concern:*

Be it known that I, JOHN EDWARD ARMSTRONG, citizen of the United States, residing at Santa Cruz, in the county of Santa Cruz and State of California, have invented new and useful Improvements in Wheelbarrows, of which the following is a specification.

My invention relates to wheelbarrows. Its object is to make a wheelbarrow in which the wheel is so supported that it may be made to run over obstructions without imparting a sudden shock, jolt or jar to the barrow, and to the person wheeling the same. By my construction, while the wheel will remain always in operative position, it will be so yieldingly connected with the barrow that the latter will not partake of the bumps and vibrations of the wheel itself.

The invention consists of the parts and the construction and combination of parts as hereinafter more fully described and claimed, having reference to the accompanying drawing, in which the figure is a perspective view of the wheelbarrow.

A represents the body of the barrow having the usual handles 2, between the lower ends of which is pivoted the wheel frame 3. This wheel frame, while it may be of any appropriate construction, is here shown as made of two bent bars separated at their outer ends to accommodate the wheel 4 which is suitably journaled between the arms of the frame 3. The portion of the arms 3 between the wheel and their fulcrum 5 on the barrow frame is approximately horizontal when the handles of the barrow are lifted, as in being rolled over the ground, while the opposite end of the wheel frame 3 lies substantially in the plane of the handles 2 and underneath the body of the wheelbarrow, with this end of the wheel frame resting loose on the spring bar 6 which extends across and rests on the handle-bars 2. The spring bar 6 is maintained in place by suitable means, as the staples 7, and the bar is of such length as to allow it to bend sufficiently under the leverage afforded by the wheel frame 3 when the barrow is being wheeled along the ground. The bar 6 may have its ends curved, as shown, so as to bend over the handle-bars and prevent the spring bar from pulling out of its guide staples 7.

With a wheelbarrow provided with this spring, or its equivalent, and the wheel hung in the forked frame and hinged in the manner shown, the barrow can be wheeled over any sort of rough or uneven surface without any shake or vibration being imparted to the barrow or to the operator; thus relieving the operator of considerable annoyance, and allowing him to work with less fatigue. This spring construction will also prevent the load being shaken out of the barrow.

Having thus described my invention, what I claim and desire to secure by Letters Patent is—

1. A wheelbarrow having in combination a barrow frame having rigid handle bars, a wheel frame journaled in the barrow frame and extending rearwardly between said handle bars, and a yielding connection on the handle bars adapted to support the free end of the wheel frame.

2. In a wheelbarrow, the combination of a barrow frame having rigid handle-bars, a wheel frame fulcrumed on the barrow frame, a wheel journaled in the wheel frame, and a spring bar on the handle-bars supporting the free end of the wheel frame.

3. In a wheelbarrow, the combination of a barrow frame having handle bars, a wheel frame fulcrumed between its ends on the barrow frame and having its rear end extending inwardly between the handle bars, and a yielding support on the handle bars for the rear end of the wheel frame.

4. In a wheelbarrow, the combination of a barrow frame having handle bars, a wheel frame fulcrumed between its ends on the barrow frame, a wheel journaled in one end of the wheel frame, and a yielding support extending transversely across the space between the handle bars and adapted to support the opposite end of the wheel frame, said yielding support comprising a spring bar loosely mounted on the handle bars.

In testimony whereof I have hereunto set my hand in presence of two subscribing witnesses.

JOHN EDWARD ARMSTRONG.

Witnesses:
H. N. MINER,
MABEL E. MOORE.